Figure 1:
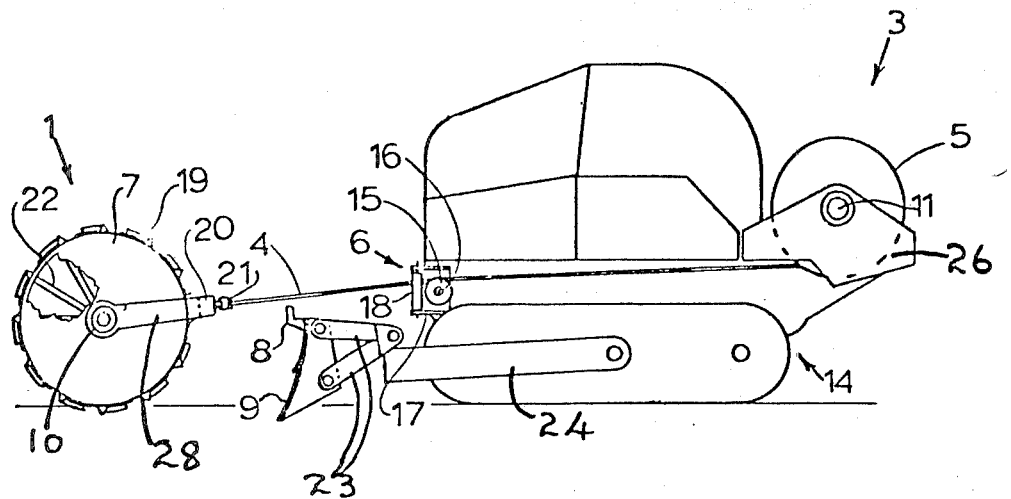

United States Patent [19]

Johnson

[11] 4,339,908
[45] Jul. 20, 1982

[54] VEGETATION CLEARING DEVICES

[76] Inventor: Richard M. Johnson, 48 Onerahi Rd., Onerahi, New Zealand

[21] Appl. No.: 185,801

[22] Filed: Sep. 10, 1980

Related U.S. Application Data

[63] Continuation of Ser. No. 59,772, Jul. 23, 1979, abandoned.

[51] Int. Cl.³ ............................................. A01D 49/00
[52] U.S. Cl. ..................................... 56/503; 172/554; 144/2 N; 37/2 P
[58] Field of Search .......................... 56/7, 503, 504; 172/539, 554; 37/2 P, 2 R; 144/2 N; 242/155

[56] References Cited

U.S. PATENT DOCUMENTS

| | | | |
|---|---|---|---|
| 2,483,762 | 10/1949 | Ebenhoe | 56/7 |
| 2,954,702 | 10/1960 | Petersen | 242/155 |
| 3,085,385 | 4/1963 | Hansen et al. | 56/7 |
| 3,937,261 | 2/1976 | Blum | 144/2 N |
| 4,158,391 | 6/1979 | Clements | 172/554 |

*Primary Examiner*—Robert A. Hafer
*Attorney, Agent, or Firm*—Holman & Stern

[57] ABSTRACT

The invention relates to vegetation clearing devices and more particularly to a gravity roller means for use in vegetation clearing. The invention provides a vehicle for use in vegetation clearing which comprises a winch arrangement mounted on the vehicle and connected with, so as to drive, two independently controllable winch drums. Control lines are mounted around the winch drums and are connected by way of a fair lead arrangement to a roller. Roller mounting means are provided at the front of the vehicle, so that with the vehicle situated in position at the top of a slope or hill, the roller is allowed to roll down the slope clearing vegetation in its path.

9 Claims, 2 Drawing Figures

VEGETATION CLEARING DEVICES

This is a continuation of application Ser. No. 59,772, filed July 23, 1979 which in turn is now abandoned.

This invention relates to improvements in and relating to vegetation clearing devices and more particularly to a gravity roller means for use in vegetation clearing.

For the purposes of forestation, for example the planting of tree seedlings and the like, it is necessary to prepare the ground by removing any existing growth of trees or scrub, either by hand or mechanically. The traditional method of vegetation clearing is usually to crush the scrub by means of a bulldozer blade or a roller device towed behind a bulldozer or to hand fell growth on the steeper slopes. After a suitable drying period, the crushed or felled dead growth is burnt and planting then takes place.

It is a feature of both the bulldozer blade and the towed roller device that they do a good job on the type of country in which they can work, particularly with reference to the towed roller, as a better burn results from the more broken nature of the vegetation, the burn in turn resulting in lower planting costs. In contrast, hand felling of vegetation of areas too steep to work with a bulldozer leaves a considerable number of unburnt limbs and tree trunks because of the uncompacted and unbroken nature of the combustible material.

It is therefore desirable to crush all country intended for afforestation with a roller device. In previous arrangements a roller for scrub clearing has been utilized which is mounted at the rear of a vehicle such as a tractor or bulldozer, but in such arrangements, a two man operation is required, one person controlling the roller and one person controlling the positioning of the tractor or, alternatively, the driver of the tractor could, of course, leave the tractor or bulldozer control cabinet and mount the roller control unit, which may be a turntable or the like mounted at the rear of the tractor. In such previous arrangements it has been known to provide a turntable at the rear of a tractor such that an area of vegetation can be cleared without the necessity of moving the tractor, but in all of these previous arrangements, it has been necessary, as hereinabove described, to use two operators, one for the tractor and one for the roller, or alternatively for the tractor driver to dismount from the tractor control cabinet and mount a roller control unit, such as a turntable, mounted at the rear of the tractor.

Accordingly, it is an object of the present invention to overcome the disadvantages hereinabove described and to provide a gravity roller arrangement whereby the roller device is substantially directionally controllable in its downward flight and whereby the operator of the tractor or the bulldozer remains in his tractor driving position facing the front of the vehicle, the roller being mountable on the front of the vehicle so as to provide for a single position of the tractor-roller operator and which enables a normal tractor or bulldozer to be readily adapted so as to be provided with the roller and associated equipment.

Further objects of this invention will become apparent from the following description.

According to one aspect of this invention there is provided a gravity rolling arrangement capable of being attached to a vehicle, comprising a winching arrangement connected with, so as to drive, two independently controllable winch drums, control lines mounted around the winch drums and connected via a fair lead arrangement to a roller, said roller being mountable at a front end of the vehicle, so as to enable lifting and transportation thereof by the vehicle.

According to a further aspect of this invention there is provided a vehicle for use in vegetation clearing comprising a winch arrangement mounted thereon and connected with, so as to drive, two independently controllable winch drums, control lines mounted around the winch drums and connected via a fair lead arrangement to a roller, roller mounting means provided at the front of the vehicle, whereby with the vehicle situated in position at the top of a slope and the roller allowed to roll down the slope clearing the vegetation in its path, the direction and speed of the roller is controlled by an operator controlling the independently controllable winch drums.

Further aspects of this invention which should be considered in all its novel aspects will become apparent from the following description, given by way of example of a preferred embodiment of the invention and in which reference is made to the accompanying drawings, wherein:

FIG. 1: shows a side view of a vehicle and a roller device associated therewith, according to a preferred embodiment of the invention.

Figure 2:
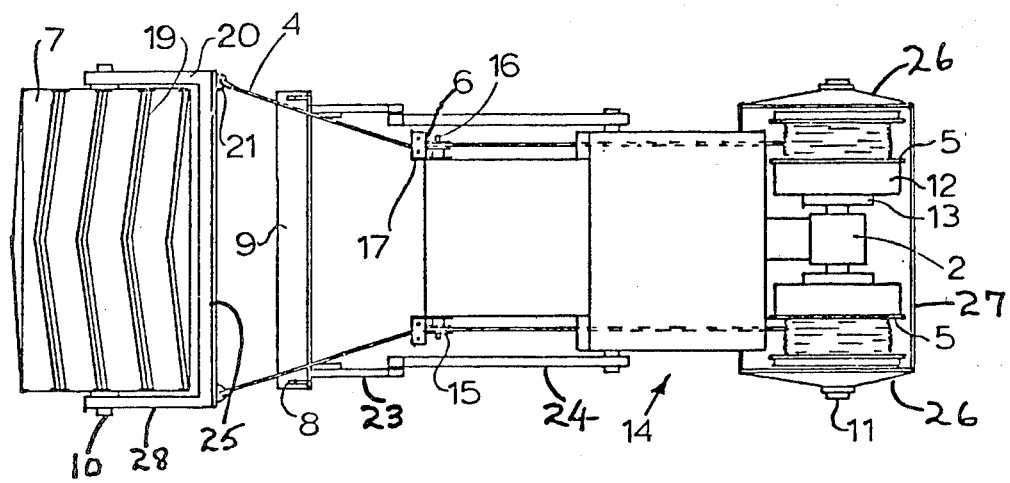

FIG. 2: shows a plan view of the arrangement of FIG. 1.

Referring now to the drawings, a vehicle 14, for example a bulldozer, tractor or the like, is associated with a gravity rolling device, indicated generally by reference arrow 1, which device, in use, as hereinafter described, is caused to roll down a slope thus clearing vegetation in its path. The roller device 1 comprises a cylindrical drum 7 of any suitable material, for example steel plate and may comprise disc shaped end covers welded, bolted or otherwise secured at either end of an elongate substantially central tubular portion. The roller device 1 is shown internally braced by means of rows of tubular spokes or supports 22 secured to and depending radially outwardly from a central axle 10. The drum 7 is provided with a plurality of inclined blade members 19 bolted, welded or otherwise secured to the periphery of the drum, as shown, the blades 19 being mounted so as to form a "V" formation on the surface of the drum. The blades 19 have a substantially pyramid shaped or triangular cross section with a cutting edge provided on the upper surface thereof. A yoke 20 of a suitable sturdy material, for example cast iron or steel, is mounted across the roller drum 7 and the legs 28 of the yoke 20 are secured to the axle 10 of the roller drum 7. The roller drum 7 is thus rotatable within the space defined by the legs 28 and a transverse member 25 of the yoke 20. The yoke 20 has provided or formed thereon at least one pair of apertured members 21 to which control lines 4 are securable. The lines 4 of a suitably strong material, for example steel cable, extend from their connection with the yoke 20 via fair lead arrangements, indicated generally by reference number 6, to independently controllable winch drums 5 mounted at the rear of the vehicle 14. The fair lead arrangements 6 are shown as comprising a mounting bracket 17, a pair of vertically mounted rollers 18 and a horizontally disposed roller 15, rotatably mounted on an axle 16, each line 4 running between the rollers 18 and over the roller 15 as it is wound and unwound, onto and from, the respective winch drum 5. In a further form of the invention, guide means (not shown) are provided between each fair lead arrangement 6 and the respective winch drum 5 and may preferably be mounted alongside the vehicle. Also a further fair lead arrangement (not shown) having further upwardly directed rollers 18a and horizontally disposed rollers 15a may be mounted behind the fair lead arrangement 6. The aforesaid guide means may comprise an elongate member having a channel cross section formed of, for example metal, and secured, for example bolted or welded, to the underside of a surface of the vehicle. Each guide member may have a horizontally disposed roller or the like mounted at both its front and rear ends to provide a further guiding action for the line 4 passing therethrough.

The vehicle 14 is shown provided with a blade 9 which is mounted by means of arms 23 and control member 24 to the vehicle body on each side thereof. The blade 9 and its mounting arrangement is of a type commonly found in bulldozers and like heavy earth moving equipment, however, it should be understood that the vehicle 14, the blade 9 and the blade mounting arrangement are not limited to that shown in the figures, and any suitable vehicle and mounting arrangement for the roller device may be used.

The blade 9 is shown having an upwardly directed projection 8 provided at each end of the blade 9 which projections 8 may be welded or otherwise secured to the upper surface of the blade 9. In use, each projection 8 locates under the transverse member 25 of the yoke 20 and the lower edge of the blade 9 engages with the under surface of the roller drum 7 such that upon actuation of the operating arms 23 and control members 24 the roller drum 7 may be lifted from the ground and carried to a required position, for example a downward slope having vegetation required to be cleared. In a further embodiment of the invention, the projections 8 on the blade are replaced by recesses formed or provided on the upper surface of the blade, which recesses engage with a surface of the yoke, for example the legs 28 of the yoke or alternatively a projection formed or provided on the yoke.

The winch arrangement indicated generally by reference numeral 3, comprises two free spooling drums 5 mounted on a winch axle 11 extending between and rotatably mounted, for example in bearings, in the side members 26 of a housing 27. The shaft 11 is driven by a winch 2 mounted at a substantially central portion of the housing 27, which winch 2 may be a usual type of logging winch found on bulldozers and the like used in forestry work. A chain drive preferably couples the winch 2 with the shaft 11 although other forms of drive may be used as required for the shaft 11. Each winch drum 5 has a brake arrangement 12 and a clutch arrangement 13, such that the spooling of the control lines 4 on the respective winch drums 5 can be independently controlled.

In use, the projections 8 are engaged in front of the transverse member 25 of the yoke 20 and the blade 9 is operated by means of its operating arms 23 and 24 so as to lift the roller device 7 from the ground. The roller device 7 is now securely located on the blade 9 and may be carried to the top of a slope required to be cleared of vegetation. The roller device 7 is now lowered to the ground and the blade 9 is firmly embedded into the ground, thus providing an efficient anchor when stopping the roller in its subsequent downhill motion. The roller 1 is now allowed to roll downhill, the blades 19 on the surface of the roller together with the kinetic energy inherent in a roller which may weigh ten tons or more and travel at 20 miles per hour or more, crushes any vegetation including trees in its path as it travels. The direction and speed of travel of the roller device is controlled by the operator of the vehicle 14 controlling the unwinding of the control lines 4 from the respective drums 5, this being done by means of the brakes 12 and the clutches 13. The roller 1 is of a sufficiently sturdy structure such that it can accommodate extreme impact loads, for example, upon impact with a tree too big to crush. Moreover, the cutting blades 19 provided with a triangular cross section and a narrow cutting edge are able to stand both bending as well as compressive loads due to their rotary motion when impacting with timber at high speed. The length of the cables or the like 4 is such that the entire downhill slopes can be cleared with the vehicle situated at the top of the slope.

Thus, by this invention there is provided an improved vegetation clearing arrangement utilizing gravity roller means, and which provides for the speedy and efficient clearing of vegetation from any downhill slopes.

Although this invention has been described by way of a preferred embodiment of the invention, it is to be understood that modifications may be made thereto without departing from the scope of the invention as defined by the appended claims.

I claim:

1. A gravity rolling arrangement for use in clearing vegetation on slopes adapted to be mounted on a vehicle comprising:
   a free-moving heavy roller means for crushing vegetation by rolling down a slope under the force of gravity;
   a yoke, between whose arms the axle of said roller means is rotatably mounted;
   at least two independently controllable winch drums;
   at least one control line mounted around each of said winch drums at one end and removably fastened at the other end to said yoke, at least one control line being connected to each side of said yoke; and
   each of said control lines passing through a fair lead system located between said winch drum and said yoke.

2. The arrangement of claim 1 wherein the roller means is adapted to be placed at the forward end of the vehicle, wherein the winch drums are adapted to be mounted at the rear end of the vehicle, and wherein a fair lead system is adapted to be mounted adjacent each side of the forward end of the vehicle.

3. The arrangement of claim 2 wherein each fair lead system comprises at least one pair of substantially vertically disposed rollers between which a control line passes and at least one substantially horizontally disposed roller over which said control line passes.

4. The arrangement of claim 1, 2 or 3 wherein a winch housing is provided adjacent a rear end of said vehicle; at least one shaft extending between opposite side members of said winch housing; said winch drums being mounted on said shaft and adjacent respective adjacent sides of said winch housing.

5. The arrangement of claim 1 wherein said yoke is of a substantially flattened "U" configuration.

6. The arrangement of claim 5 wherein said roller means is a roller having a substantially centrally mounted axle, said axle being rotatably mounted between two arms of said yoke; radially directed support members being secured to and extending outwardly from the axle and being secured to an inner surface of said roller.

7. The arrangement of claim 6 wherein the vehicle is a tractor.

8. The arrangement of claim 7 wherein the tractor has a bulldozer blade adapted to carry the roller means so as to enable lifting and transportation thereof by the vehicle.

9. The arrangement of claim 8 wherein the bulldozer blade comprises an anchoring means whereby when the blade is lowered and embedded in the ground, the vehicle is anchored against the kinetic energy transfer caused by stopping the roller means while in its downslope motion.

* * * * *